United States Patent Office 2,962,189
Patented Nov. 29, 1960

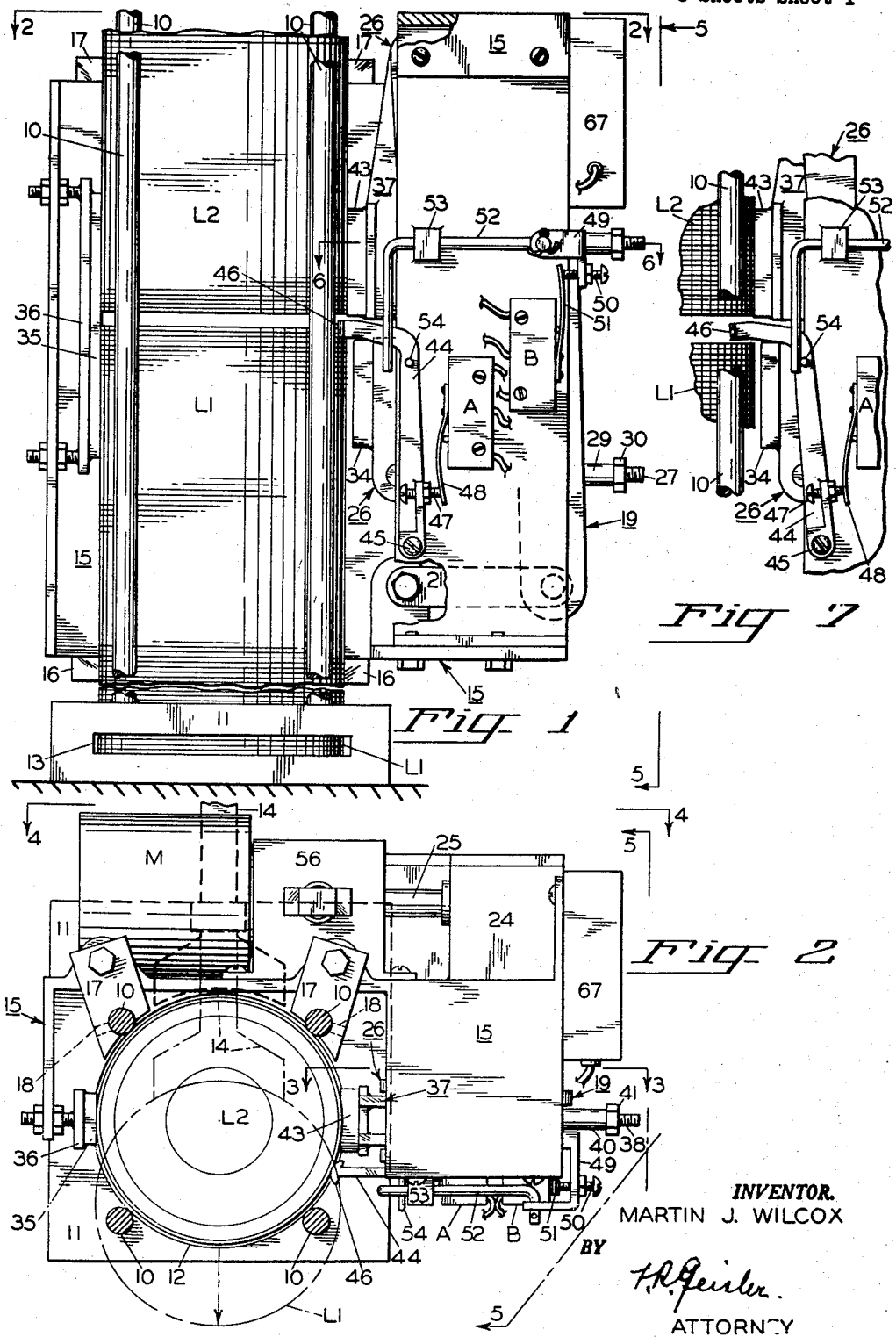

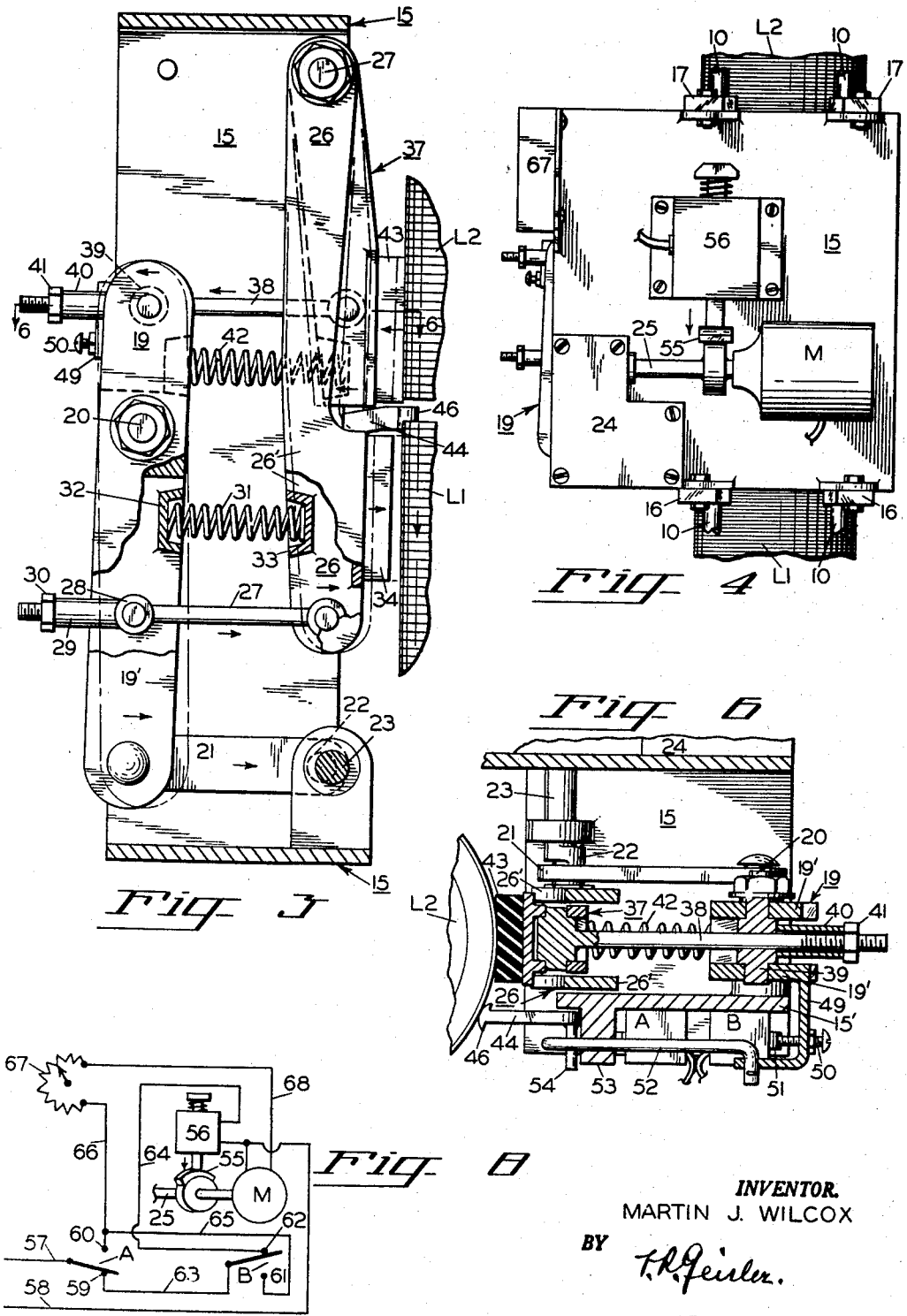

2,962,189

CAN LID FEEDER CONTROL

Martin J. Wilcox, 425 SW. Maplecrest Drive, Portland, Oreg.

Filed Jan. 2, 1959, Ser. No. 784,651

5 Claims. (Cl. 221—10)

This invention relates to the feeding of lids for cans to a can lidding, closing or sealing machine. It is customary with such devices to place quantities of the lids for the cans in a downwardly-leading chute from the bottom or discharging end of which the lids are thrust, one at a time, onto a conveyor which then delivers the separate individual lids in rapid succession to the can closing machine to which the filled body portions of the cans are simultaneously delivered at the same rate from another source.

In deliverying lids from the chute onto their conveyor for the closing machine the bottom lid from the stack deposited in the chute is pushed out each time onto the conveyor. However, if the stack of lids is too high and thus too heavy, the pressure of the stack on the lids located at the bottom often interfers with the pushing out of the bottom lid, either preventing a lid from being pushed out or causing it to be pushed out more slowly and thus with improper timing, or, in some cases, causing more than one lid to be pushed out at the same time. Such difficulty occurs even more frequently if the lids have rough or raised surface portions, as, for example, stamped marking, which increases the tendency for superimposed lids to stick together.

The present invention relates specifically to this problem of deliverying the lids from a chute onto a conveyor for the can closing machine.

The object of the invention is to provide a suitable automatic control, to be employed in conjunction with a chute for can lids, which will allow a predetermined limited stack of lids to be deposited at the bottom of the chute for the customary delivery onto the lid conveyor, and will temporarily hold back further lids in the chute when the stack at the bottom of the chute is of the desired predetermined size, thus preventing the pressure weight on the bottom lids in the stack from exceeding a predetermined amount.

A related object of the invention is to provide a control which, as long as can lids are being deposited in the chute, will constantly maintain the available stack in the bottom of the chute approximately at the desired predetermined size.

Another object of the invention is to provide a control of the type indicated which can be made entirely automatic in its operation and which will be simple and practical in construction and will present no special maintenance problem.

A further object is to provide automatic can lid feeder control which can easily be adjusted so as to cause a larger or smaller stack of lids to be maintained at the bottom of the chute for delivery onto the lid conveyor, when desired, and thus, for example, to enable a larger stack to be maintained for perfectly smooth lids or light weight lids, but adjusted for a smaller stack when rough, embossed, or heavier lids are being used.

The manner in which these objects and other advantages are attained and the construction and method of operation of the lid control comprising the present invention will be described and explained in the course of the following brief description with reference to the accompanying drawings.

In the drawings:

Fig. 1 is a side elevation of the device showing the same mounted in place near the bottom end of a lid chute, the lower base portion of the chute being fore-shortened and shown partly in section;

Fig. 2 is a top plan view of the device, with chute members shown in section, and indicating more or less diagrammatically the operation of the thrusting means positioned at the bottom end of the chute for pushing the bottom lid out from the bottom of controlled lid stack, this plan view being taken on line 2—2 of Fig. 1;

Fig. 3 is a sectional elevation taken on line 3—3 of Fig. 2 but drawn to a larger scale;

Fig. 4 is a side elevation taken on line 4—4 of Fig. 2 but drawn to a much smaller scale, showing the side opposite that shown in Fig. 1;

Fig. 6 is a horizontal section taken on line 6—6 of Fig. 1, drawn to a slightly larger scale, this section also corresponding to line 6—6 in Fig. 3;

Fig. 7 is a fragmentary elevation corresponding in part to Fig. 1 and indicating the relative position of certain members when the device is about to operate to permit additional lids to be deposited onto the stack, the device in Fig. 1 illustrating the position of the same members when the number of lids in the stack has reached the desired number; and Fig. 8 is a small wiring diagram.

Figure 5:
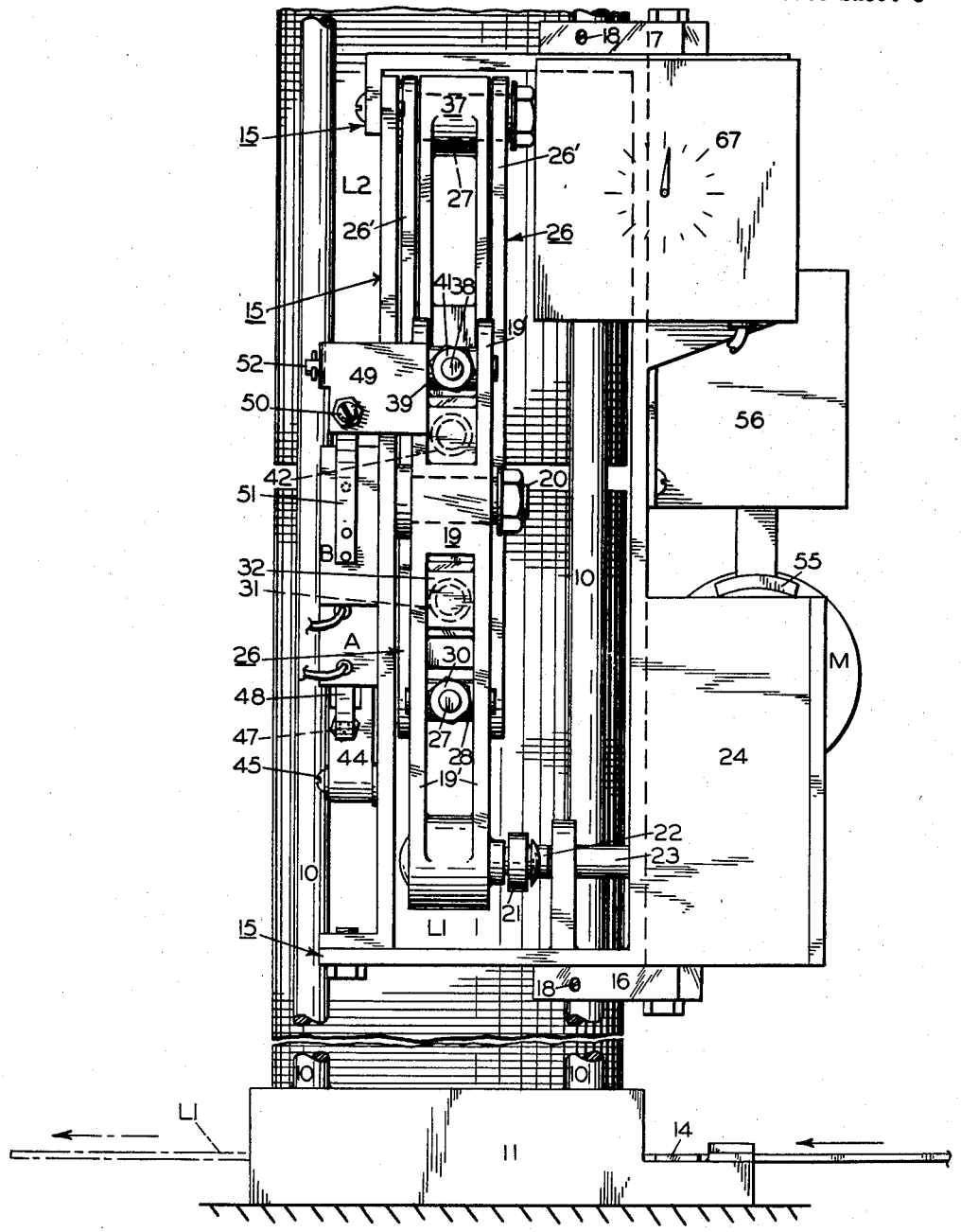
Fig. 5 is an elevation taken on line 5—5 of Figs. 1 and 2 but drawn to a larger scale.

Referring first to Figs. 1, 2 and 5, the chute for the can lids is composed of four parallel rods 10, which, in the bottom end portion of the chute illustrated, are arranged vertically. These rods are spaced about a circle which is slightly larger than the perimeter of the can lids and consequently these rods form a guideway or chute down which the lids will drop when deposited in the chute at some point higher up. The bottom ends of the rods 10 are secured in a base 11. This base has a circular recess 12 for receiving some of the lids and the wall of the recess is slotted on opposite sides, the slots beginning at the bottom of the recess and extending upwardly a slight distance. One of these slots is shown at 13 in Fig. 1 and is of sufficient size to permit two or three lids to be thrust through the slot. The opposite slot (not shown) accommodates a plunger 14 (Figs. 2 and 5), which, when moved into the recess 12 along the bottom, causes the bottom lid in the recess to be pushed out through the slot 13 for feeding onto a lid conveyor (not shown) by which the lids are fed in succession to the can closing machine. The plunger 14 is operated by suitable means (not shown) in proper timing with the operation of the can closing machine. The structure thus far described is old and well known. Various means are used for feeding the bottom lid of the stack to the can closing machine, but the means indicated is a simple means and sufficient to serve for illustration.

As previously mentioned, when the stack of lids resting on the recessed base 11 becomes too large and consequently exerts too great a pressure on the bottom lids in the stack, the proper functioning of the lid feeding means may fail. The feeder control of the present invention operates to limit the number of lids in the bottom of the chute to a predetermined desired amount and holds the other lids received in the chute in a stack slightly spaced above the bottom stack and in such manner as not to exert any pressure on the bottom stack. The lids are fed a few at a time from the upper stack to the bottom stack. In the figures L1 indicates the lids in the bottom stack and L2 indicates the lids in the upper stack.

The feeder control includes a support frame assembly, indicated as a whole by the reference character 15, which includes various brackets, bearing lugs, and housing units, which are bolted or welded in place to form a composite rigid frame assembly. This entire frame assembly 15 is supported on a pair of lower bracket arms 16 (shown best in Figs. 4 and 5) and by an identical aligned pair of upper bracket arms 17 (see also Fig. 2), which two pairs of bracket arms are slidably mounted on a pair of the rods 10 of the chute and are removably secured in desired position on the rods by suitable means such as set screws 18. Thus the entire frame assembly can be adjusted up or down on the chute as may be desired.

An integral double arm 19 (Figs. 3, 5 and 6) composed of two parallel side members 19', is pivotally mounted on a bolt 20 (Figs. 3 and 5), secured to a wall of the frame assembly and so arranged as to rock to a limited extent on the bolt 20 in a vertical plane. A link 21 (Figs. 1, 3 and 5) is pivotally connected to the lower end of this arm 19 and the other end of the link 21 is carried on a cam (indicated at 22 in Fig. 3) mounted on a shaft 23. The shaft 23 is connected by suitable reduction gearing (not shown but enclosed in the housing compartment 24) with a shaft 25 (Figs. 2 and 4) driven from a motor M. Thus the operation of the motor produces rocking of the arm 19 as indicated by the broken lines in Fig. 3.

A second similar integral double arm 26, composed similarly of two side members 26' (Figs. 3 and 5) is pivotally mounted at the top on a bolt 27 secured on the same wall of the frame assembly as the pivot bolt 20 for the arm 19. Thus these arms 19 and 26 are located in the same vertical plane and are substantially parallel, but arm 26 is positioned higher on the frame assembly wall. A link bar 27 (Fig. 3) has one end pivotally connected to the lower end of the arm 26. This link bar is slidable in a bearing 28 carried in the arm 19. A sleeve 29 is carried on the outer end of the link bar 27 and is held in adjustable position thereon by the nut 30.

A spring 31 (Fig. 3) has its ends seated in pockets 32 and 33 provided in the arms 19 and 26 respectively, this spring being held under compression. Consequently this spring 31 and the adjustable link bar 27 cooperate in keeping the lower end of the arm 26 spaced a slight distance from the arm 19, the spring 31 making it possible for the arm 26 to be forcibly moved closer to the arm 19 but the link bar 27 preventing the arm 26 from moving further from the arm 19 than permitted by the adjustable sleeve 29 and nut 30 on the link bar 27. As a result of this connection between the arms 19 and 26 the rocking of the arm 19 causes corresponding rocking of the arm 26.

A lid-engageable element 34 (see Fig. 3 and also Figs. 1 and 7), preferably composed of compressible, resilient material, such as rubber for example, is secured on the arm 26 near the lower end of the arm and is so arranged as to project slightly into can lid chute when the arm is moved to the right, as viewed in Fig. 3. A stationary cooperating lid-engaging element 35 (Fig. 1), also preferably similarly composed of compressible, resilient material, is attached to a vertical bar 36 which is adjustably mounted on the support frame assembly 15 diametrically across the can lid chute from the element 34. This stationary element 35 extends up beyond the level of the element 34 and is so positioned as to touch the edges of the can lids as they move down the chute. When the arm 26 and its lid-engageable element 34 are moved to the left, as viewed in Fig. 1 (or to the right as viewed in Fig. 3), then the element 34 will combine with the diametrically opposite element 35 to exert a clamping and holding pressure on any lids positioned between these two elements and restrain the engaged lids and those above them from further movement on down the chute until the arm 26 and its element 34 are moved in a releasing position.

A supplemental arm 37 (Figs. 3 and 5) is carried in the upper end of arm 26 and is pivotally mounted on the same bolt 27 with the arm 26. A link bar 38, similar to the link bar 27, has one end pivotally connected to the supplemental arm 37. This link bar 38 is slidable in a bearing 39 carried in the arm 19. A sleeve 40 is carried on the outer end of the link bar 38 and is held adjustably thereon by the nut 41. A spring 42 (Fig. 3) is held under compression between the upper end of arm 19 and the supplemental arm 37, the ends of the spring being seated in suitable pockets in the respective arms.

From Fig. 3 it will be apparent that the rocking of arm 19 will cause the lower end of arm 26 and the lower end of its upper supplemental arm 37 to move in opposite directions. A can lid-engageable element 43, similar to the engageable element 34, is carried on the lower portion of the supplemental arm 37, being spaced a slight distance above element 34 and also positioned along the side of the lid chute diametrically opposite the upper portion of the stationary lid-engaging element 35.

The alternate opposite movements of the lid-engageable elements 34 and 43 produced by the rocking of the arm 19, will cause each of the elements 34 and 43, operating in conjunction with the stationary element 35 on the opposite side of the chute, alternately to engage and then to release the can lids in contact with such elements. For example, assuming that these elements are in the positions illustrated in Fig. 1 with the element 43 in lid-clamping position, the can lids which are moving down the chute will be prevented from passing below the element 43, while those lids in the chute which are below the element 43 and opposite the element 34 will be free to move downwardly as lids are removed from the bottom of the chute onto the lid conveyor. Subsequently, when the element 43 is moved into disengaging position while the element 34 is moved oppositely into engaging position, some of the lids previously held by the element 43 will then be free to drop down further in the chute to be restrained by the element 34. In this way, with each cycle of operation of the device, a few lids will be allowed to move on down the chute.

In achieving the object of invention, however, it is necessary not only to control the movement of can lids down to the bottom of the chute but also to limit the number, and thereby the weight of the stack of lids actually resting on the base 11, so that the weight imposed on each bottom lid when it is to be pushed out from the stack and onto the lid conveyor will at no time exceed a desired predetermined amount. In Fig. 1 the lowest stack L1 is assumed to be the maximum stack of lids desired at any one time in the bottom of the lid chute for dispensing. The control device is positioned at such a height on the chute that the top of the maximum desired stack will extend only a slight distance above the top of the lid-engageable element 34 of the arm 26. The remaining lids in the chute are held in the upper stack L2, the bottom of which is spaced a slight distance above the top of the lower stack L1. Then lids from the bottom of the upper stack are permitted to drop onto the lower stack with the operation of the device as the level of the lower stack falls.

The operation of the device and the automatic starting and stopping of the motor M are controlled by a simple switch assembly which will now be described. A control arm 44, shown best in Figs. 1 and 7, is pivotally mounted at 45 on the outside of a wall of the support frame assembly. The upper end of this control arm is bent sharply towards the lid chute so as to extend into the path of the lids. The upper end terminates in a rounded head 46 adapted for engagement with the edges of the lids. An integral flange on the lower portion of this control arm carries an adjustable screw 47 which contacts a spring member 48 on a double-acting switch A. The spring 48 acts normally to maintain the control arm 44 in the position shown in Fig. 7. However, when the lower stack of lids L1 is high enough so that the top lids of this stack come into contact with the upper terminal end 46 of the control arm 44, then the control arm is held against the force of the switch spring 48 in the position shown in Fig. 1.

A second double-acting switch B (Fig. 1) is mounted adjacent the switch A, and, as explained later, is connected with switch A. A bracket 49 (Figs. 5, 6 and 1) is provided on the upper end of the arm 19 and extends around over the edge of the housing frame wall. A screw 50, adjustably carried in this bracket, engages a spring member 51 on the double-acting switch B. A bar 52, the outer end of which is turned downwardly at a right angle, is attached to the end of the bracket 49. This bar is slidable in a guideway 53 and extends down over, and is slightly spaced from, the outer face of the control arm 44 (Figs. 1, 6 and 7), and, at certain times, the bottom end of this bar engages a pin 54 on the control arm 44.

The motor M (Figs. 2, 4, 5 and 8) is provided with a suitable friction brake 55 which is applied through activation of a solenoid 56, the brake being withdrawn to inoperative position by spring means when the solenoid is not being activated. The brake serves to prevent any over-running of the motor when the circuit to the motor is interrupted. The circuits to the motor M and to the solenoid 56, and consequently the operation of the device, are automatically controlled through the medium of the double-acting switches A and B and through the movement of the control arm 44.

When the device is in the position illustrated in Fig. 1, the number of lids in the bottom stack L1 will have reached the desired maximum and the top lids of this stack, by bearing against the terminal 46 of the control arm 44, will have pushed the control arm to the right (as viewed in Fig. 1) against the force of spring 48. This interrupts the circuit to the motor M and activates the brake solenoid, as will be apparent presently with reference to Fig. 8.

It will be noted from Fig. 1 that the upper lid-engageable element 43 is in lid-clamping position, preventing any lids from the upper stack L2 from dropping down onto the lower stack L1, and that the lower lid-engageable element 34 is correspondingly in lid-releasing position enabling the lids in the lower stack L1 to move downwardly as they are utilized. These positions of the upper and lower lid-engageable elements 43 and 34 are due to the position of the arm 19 (Fig. 3) which will be in the full line position shown in Fig. 3, instead of in the broken line position. In this position of the arm 19 the bracket 49 will be in the position shown in Fig. 1 and the screw 50 will have thrust the spring 51 to the left.

This position of the double-acting switches A and B is illustrated in the diagram of Fig. 8. In this figure, 57 and 58 are conductor lines connected with a suitable source of power. In switch A the contact element 59 is connected and in switch B the contact element 62 is connected. Consequently the circuit to the brake solenoid 56 is closed through the lines 63 and 64 and the main conductor 58, while the circuit to the motor M is open.

When the lower stack L1 (Fig. 1) is reduced sufficiently to cause the top lids to drop below the tip of the control arm 44, this arm, under the force spring 48, will move out into the position shown in Fig. 7. This will cause switch A (Fig. 8) to close the contact 60, which opens the circuit to brake solenoid 56, causing the brake to be released by its spring, and closes the circuit to the motor M through line 66, rheostat 67 and line 68. The resulting operation of the motor momentarily reverses the relative positions of the lid-engageable elements 34 and 43, releasing lids from the upper stack L2 and allowing them to drop onto the lower stack L1, while the holding of the lids in the top of the lower stack L1 by the element 34 prevents too great a weight of lids being imposed upon the lower stack L1. With the moving of the upper lid-engageable element 43 to releasing position the bracket 49 also moves in the same direction and enables the spring 51 of switch B to move out in that direction. This causes contact element 61 (Fig. 8) of switch B to be engaged. Also the bracket 49 pulls the sliding bar 52, (Fig. 1) which engages the pin 54 on the control arm 44 and pulls the control arm 44 out of lid contact. This again closes the contact 59 in switch A, (Fig. 8) but, since the contact 61 in switch B is closed, the motor M continues to operate until the upper lid-engageable element 43 returns to engaging position, which again closes the contact 62 in switch B, and, if lids are now engaging the control arm 44 and thus maintaining the contact 59 in switch A closed, this results in opening the circuit to the motor M and closing this circuit to the brake solenoid 56. However, if there are now not enough lids in the lower stack L1 to cause the control arm 44 to be engaged by the top lids, the movement of the control arm again to the position in Fig. 7 causes the cycle of operation of the motor to be repeated.

In this way the stack L1 in the bottom of the chute is automatically replenished as long as lids are being deposited in the chute and as long as the device is operating, and the bottom stack L1 never exceeds by more than one or two lids the predetermined size and weight of the lid stack as may be desired under the particular circumstances.

Should a larger or a smaller maximum be desired for the stack L1 for any reason, such change is accomplished merely by raising or lowering the position of the entire control device on the lid chute, and this can be done quickly, for example, by loosening the set screws 18 in the pairs of brackets 16 and 17 to enable the device to slide up or down on the pair of supporting chute rods 10.

Various minor modifications would of course be possible in this device without departing from its main and essential features and without departing from the principle of the invention. It is not intended to restrict the device to the exact construction which has been illustrated, or to limit the invention except as provided by the claims.

I claim:

1. In a can lid feeder control adapted for use near the lower end of a can lid chute, an upper lid-engageable element, a lower lid-engageable element spaced below said upper element, said elements located on one side of said chute and movable into and out of position for engaging the lids in said chute, means including a rocker for moving said elements simultaneously in opposite directions and alternately into and out of lid-engaging position, a motor operating said rocker, a control member movable into and out of said chute for engagement by lids in said chute, and resilient means urging said member into said chute but enabling lids in said chute to push said member from said chute against the force of said resilient means, said control member acting to close the circuit to said motor when said member moves into said chute and to interrupt said motor circuit when lids in said chute push said member from said chute.

2. In a device of the character described adapted for use near the lower end of a can lid chute, a housing assembly, an upper lid-engageable element, a lower lid-engageable element spaced below said upper element, said elements located on one side of said chute and movable into and out of position for engaging the lids in said chute, operating means in said housing assembly interconnecting said elements and simultaneously moving said elements in opposite directions and alternately moving them into and out of the path of the lids in said chute, a motor operating said operating means, switch means in the circuit for said motor, and a switch control member mounted in said housing assembly for movement into and out of said chute for engagement by lids in said chute, spring means urging said member into said chute but enabling lids in said chute to push said member from said chute against the force of said spring means, said control member acting through the medium of said switch means to close the circuit to said motor when said member moves into said chute and to interrupt said motor circuit when lids in said chute push said member from said chute, said operating means so arranged that said upper element will be held in lid-engageable position and said lower element will be held out of lid-engageable position while said motor is not operating, whereby the movement of said upper element out of lid-engageable position and then back to lid-engageable position will enable a small supply of lids to drop below said upper element to said lower element, and whereby said switch control member will keep the stack of lids dispensable from the bottom of said chute from extending above said switch control member.

3. In a can lid feeder control adapted for use near the lower end of a can lid chute composed of a plurality of parallel rods, a housing assembly mounted on said chute, an upper lid-engageable element, a lower lid-engageable element spaced below said upper element, said elements supported in said housing assembly and located on one side of said chute and movable into and out of position for engaging the lids in said chute, operating means including a rocker in said housing assembly interconnecting said elements for moving them simultaneously in opposite directions and moving them alternately into and out of lid-engageable positions, a motor operating said rocker switch means in the circuit for said motor, and a switch control arm movable into and out of said chute between said elements for engagement by lids in said chute, spring means urging said arm into said chute but enabling lids in said chute to push said arm from said chute against the force of said spring means, said control arm acting through the medium of said switch means to close the circuit to said motor when said arm moves into said chute and to interrupt said motor circuit when the lids in said chute between said elements push said arm from said chute, said operating means so arranged that said upper element will be held in lid-engageable position and said lower element out of lid-engageable position while the circuit to said motor is interrupted, whereby the movement of said upper element out of lid-engageable position and then back to lid-engageable position will enable a small supply of lids to drop below said upper element to said lower element while said switch control arm will keep the stack of lids dispensable from the bottom of said chute from extending above said control arm.

4. A can lid feeder control adapted for use near the lower end of a can lid chute, said feeder control including a housing assembly mounted on said chute, an upper lid-engageable element, a lower lid-engageable element spaced below said upper element, said elements supported in said housing assembly and located on one side of said chute and movable into and out of position for engaging the lids in said chute, operating means in said housing assembly for simultaneously moving said elements in opposite directions and alternately moving said elements into the path of the lids in said chute, a rocker in said operating means, a motor operating said rocker, a brake for said motor, switch means in the circuit for said motor, and a switch control member pivotally mounted in said housing assembly for movement into and out of said chute between said elements for engagement by lids in said chute, means urging said member into said chute but enabling lids in said chute to push said member from said chute against the force of said latter mentioned means, said control member acting through the medium of said switch means to close the circuit to said motor when said member moves into said chute and to interrupt said motor circuit when lids in said chute between said elements push said member from said chute, said operating means so arranged that said upper element will be held in lid-engageable position and said lower element will be held out of lid-engageable position while said motor is not operating, whereby the movement of said upper element out of lid-engageable position and then back to lid-engageable position will enable a small supply of lids to drop below said upper element to said lower element while said switch control member will keep the stack of lids dispensable from the bottom of said chute from extending above said switch control member.

5. A can lid feeder control adapted for use near the lower end of a can lid chute composed of a plurality of parallel rods, said feeder control including a housing assembly mounted on a pair of said rods of said chute and adjustable up and down thereon, an upper lid-engageable element, a lower similar lid-engageable element spaced below said upper element, said elements supported in said housing assembly, and located on one side of said chute and movable into and out of position for engaging the lids in said chute, operating means in said housing assembly interconnecting said elements for moving them simultaneously in opposite directions and moving them alternately into and out of lid-engageable positions, a rocker in said operating means, a motor operating said rocker, a solenoid-operated brake for said motor, switch means in the circuits for said motor and said brake solenoid, and a switch control arm pivotally mounted in said housing assembly for movement into and out of said chute between said elements for engagement by lids in said chute, a spring urging said arm into said chute but enabling lids in said chute to push said arm from said chute against the force of said spring, said control arm acting through the medium of said switch means to close the circuit to said motor when said arm moves into said chute and to interrupt said motor circuit and activate said brake solenoid when lids in said chute between said elements push said arm from said chute, said operating means so arranged that said upper element will be held in lid-engageable position and said lower element will be held out of lid-engageable position while the circuit to said motor is interrupted, whereby the movement of said upper element out of lid-engageable position and then back to lid-engageable position will enable a small supply of lids to drop below said upper element to said lower element while said switch control arm will keep the stack of lids dispensable from the bottom of said chute from extending above said control arm, and whereby the maximum number of lids which can be maintained in said dispensable bottom stack can be adjusted by raising or lowering said housing assembly on said chute.

References Cited in the file of this patent
UNITED STATES PATENTS

| | | |
|---|---|---|
| 2,782,577 | Beall | Feb. 26, 1957 |
| 2,889,073 | Nogle | June 2, 1959 |
| 2,893,338 | Fiedler et al. | July 7, 1959 |